(12) United States Patent
Hasegawa et al.

(10) Patent No.: US 8,007,975 B2
(45) Date of Patent: *Aug. 30, 2011

(54) COLORANT AND TONER

(75) Inventors: Shinji Hasegawa, Kanagawa (JP);
Kazunori Anazawa, Kanagawa (JP);
Yuka Ito, Kanagawa (JP); Minquan Tian, Kanagawa (JP); Kazuhiko Hirokawa, Kanagawa (JP); Makoto Furuki, Kanagawa (JP); Kazunaga Horiuchi, Tokyo (JP); Takashi Matsubara, Kanagawa (JP); Tomoko Miyahara, Kanagawa (JP); Miho Watanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 823 days.

This patent is subject to a terminal disclaimer.

(21) Appl. No.: 12/003,340

(22) Filed: Dec. 21, 2007

(65) Prior Publication Data

US 2008/0166650 A1 Jul. 10, 2008

(30) Foreign Application Priority Data

Jan. 4, 2007 (JP) ................................. 2007-000182
Oct. 18, 2007 (JP) ................................. 2007-271753

(51) Int. Cl.
*G03G 9/09* (2006.01)
(52) U.S. Cl. .................................................. 430/108.21
(58) Field of Classification Search .................. 548/455, 548/518, 524; 430/108.1, 108.21
See application file for complete search history.

(56) References Cited

U.S. PATENT DOCUMENTS

| 4,175,956 A | * | 11/1979 | Haley et al. ..................... 430/37 |
| 5,849,456 A | * | 12/1998 | Matsumura et al. ..... 430/137.18 |
| 6,022,662 A | * | 2/2000 | Matsumura et al. ....... 430/110.4 |
| 7,667,047 B2 | * | 2/2010 | Ito et al. ........................ 548/518 |

FOREIGN PATENT DOCUMENTS

| JP | A-2000-265077 | 9/2000 |
| JP | A-2000-345059 | 12/2000 |
| JP | A-2003-41144 | 2/2003 |
| JP | A-2003-41145 | 2/2003 |

OTHER PUBLICATIONS

Diamond, A.S., et al., ed.,Handbook of Imaging Materials, Second edition, Marcel Dekker, Inc., NY (2002), pp. 174, 175, and 178.*
'Treibs, A., et al., "Cyclobutenderivate der Pyrrolreihe", Justus Leibigs Annalen der Chemie (1966), 699, pp. 153-167.*
American Chemical Society on STN abstract AN: 1967:47295 , entered STN on May 12, 1984, describing Treibs, A.,et. al.,"Cyclobutenderivate der Pyrrolreihe", Justus Leibigs Annalen der Chemie (1966), 699, pp. 153-167.*
Neufeldt, V. ,et al., ed., Webster's New World Dictionary, third college edition, Simon & Schuster, Inc., NY (1988), p. 335.*

* cited by examiner

*Primary Examiner* — Janis L Dote
(74) *Attorney, Agent, or Firm* — Oliff & Berridge, PLC

(57) ABSTRACT

A colorant comprising an aggregate of a molecule having a squarylium skeleton and having a maximum absorption wavelength at about 500 nm to about 600 nm in a molecular dispersion state.

4 Claims, 15 Drawing Sheets

COLORANT AND TONER

CROSS-REFERENCE TO RELATED APPLICATIONS

This application is based on and claims priority under 35 USC 119 from Japanese Patent Application No. 2007-000182 filed Jan. 4, 2007 and Japanese Patent Application No. 2007-271753 filed Oct. 18, 2007.

BACKGROUND (i) Technical Field

The present invention relates to a colorant and a toner.

(ii) Related Art

As a black-colored material for use in an information recording material such as an electrophotographic toner or an ink for an ink jet printer, already known for example are carbon black, aniline black, black iron oxide and black titanium oxide (for example cf. Organic Pigment Handbook, edited by Color Office (2006)).

The aforementioned black-colored materials are used, in addition to as the information recording material, as a material for providing a black-colored light-shielding glass, a black matrix material for a plasma display and a liquid crystal display, and an agricultural light-shielding film with a black color or a light-shielding property.

SUMMARY

According to an aspect of the invention, there is provided a colorant comprising an aggregate of a molecule having a squarylium skeleton and having a maximum absorption wavelength at about 500 nm to about 600 nm in a molecular dispersion state.

BRIEF DESCRIPTION OF THE DRAWINGS

Exemplary embodiments of the present invention will be described in detail based on the following figure, wherein.

DETAILED DESCRIPTION

Colorant

Figure 1:
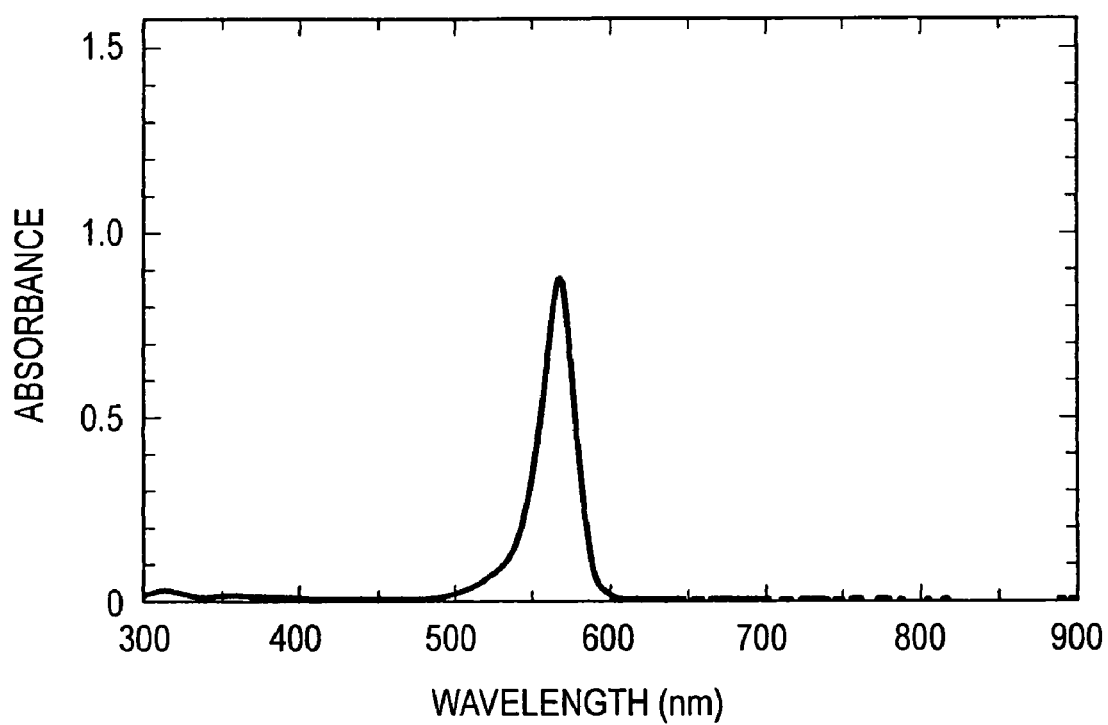
FIG. 1 is a view showing an optical absorption spectrum of a THF solution of SQUARYLIUM ST345.

The colorant of the present invention is formed by including an aggregate of a molecule having a squarylium skeleton and having a maximum absorption wavelength at from 500 or about 500 nm to 600 or about 600 nm in a molecular dispersion state.

In the present specification, a molecule having a squarylium skeleton means a molecule represented by a following formula (A):

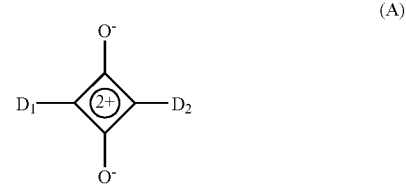

(A)

wherein, in the formula (A), $D_1$ and $D_2$ represent donor sites, and $D_1$ and $D_2$ may represent a same structure or different structures.

Also the structure represented by the formula (A) includes structures of following formulae (A-1) and (A-2);

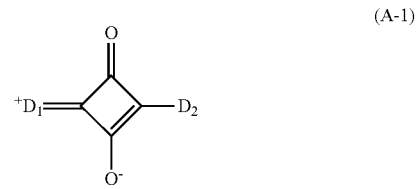

(A-1)

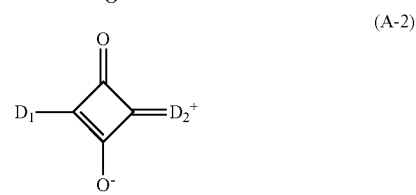

(A-2)

In the present specification, the molecular dispersion state means a state in which molecules are dissolved in a polar non-aqueous solvent.

The polar non-aqueous solvent may be any good solvent for the molecule having the squarylium skeleton, such as tetrahydrofuran (THF), acetone, ethanol or acetonitrile. In the present invention, it is preferable to confirm the maximum absorption wavelength by dissolving the molecule in THF.

Also as the conditions for confirming the maximum absorption wavelength, it is preferable to set the temperature at 25° C. and to set the concentration of the molecule having the squarylium skeleton so as to have an absorbance of about 1 at the maximum absorption wavelength, by regulating a molecular concentration in the solvent and a cell length of the measuring cell.

The colorant of the present invention, by satisfying the aforementioned construction, shows a translucency to the near infrared light and shows a higher absorbance to the light of visible region, in comparison with the CMY-mixed black or the black perylene type pigment.

The effects above exhibited by the colorant of the present invention are based on the finding of the present inventors that, by a solidification (pigment formation) of a squarylium molecule exhibiting a maximum absorption in a central range (500 or about 500 nm to 600 or about 600 nm) of the visible region in a molecular dispersion state, obtainable is an aggregate expressing two new absorption bands at the shorter wavelength side and at the longer wavelength side of the central range, and that thus expressed absorption bands can cover the entire visible region without significantly intruding the near infrared region.

In the colorant of the present invention, in the squarylium skeleton of the molecule, at least one of the donor sites is preferably a substituted-structure of pyrrole. In the substituted-structure of pyrrole in the present invention, adjacent substituents may be bonded with each other to form a ring. In such case, the donor site has a low formula weight (partial molecular weight) and can assume a compact structure, thus facilitating to obtain an effect of providing the colorant with a sufficient color developing property.

Also in the case that at least one of the donor sites is a substituted-structure of pyrrole, it is preferable that 2-position or 3-position is bonded with squaric acid. Such construction facilitates to obtain an effect, in the formation of aggregate, of utilizing a hydrogen bond between hydrogen on N-atom and oxygen site in the adjacent squaric acid molecule.

In the colorant of the present invention, in view of forming an aggregate suitable for expressing a wide absorption band in the visible region, the molecule is preferably a compound represented by the following general formula (1):

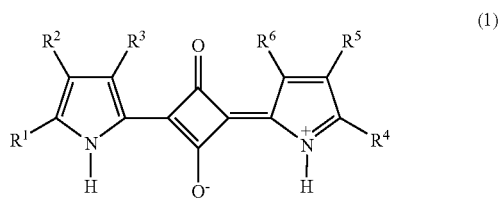

(1)

wherein, in the formula (1), substituents adjacent with each other which may be $R^1$ and $R^2$, $R^2$ and $R^3$, $R^4$ and $R^5$, or $R^5$ and $R^6$, may be bonded with each other to form a 3-, 4-, 5-, 6- or 7-membered saturated alicyclic hydrocarbon ring, and $R^1$, $R^2$, $R^3$, $R^4$, $R^5$ and $R^6$, not constituting the saturated alicyclic hydrocarbon ring, each independently represents a hydrogen atom, a methyl group, an ethyl group, a —COOCH$_3$ group, a —COOC$_2$H$_5$ group, or a —COCH$_3$ group.

Also in the colorant of the present invention, in view of reducing the steric hindrance between the substituents of the adjacent molecules thereby facilitating the formation of aggregate, the molecule is preferably a compound represented by the following general formula (2):

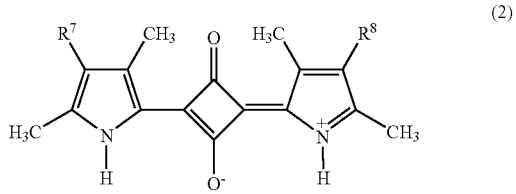

(2)

wherein, in the formula (2), $R^7$ and $R^8$ each independently represents a hydrogen atom, a methyl group, an ethyl group, a —COOCH$_3$ group, a —COOC$_2$H$_5$ group, or a —COCH$_3$ group.

The colorant containing an aggregate of the compound represented by the general formula (2) can exhibit a broader absorption band in the visible region, in comparison with a case in which the compound represented by the general formula (2) is dissolved in a molecular state (non-aggregated state) in a solvent or a resinous medium.

Further, among the compounds represented by the general formula (2), those other than ones in which $R^7$ and $R^8$ are both hydrogen atoms, namely those in which at least either of $R^7$ and $R^8$ is a hydrogen atom, a methyl group, an ethyl group, a —COOCH$_3$ group, a —COOC$_2$H$_5$ group, or a —COCH$_3$ group are more preferable as a black-colored material, because of a good balance of two absorption bands expressed at the shorter wavelength side and the longer wavelength side of the central area in the visible region.

Also the colorant of the present invention, in view of improving the optical absorbing ability in the visible region, preferably contains, as the aggregate, an aggregate of the compound of the general formula (2) in which $R^7$ and $R^8$ are both ethyl groups.

Also the colorant of the present invention, in view of improving the oxidation resistance by the effect of an electron attracting substituent, preferably contains, as the aggregate, an aggregate of the compound of the general formula (2) in which $R^7$ and $R^8$ are both —COCH$_3$ groups.

Also the colorant of the present invention, in view of improving the light resistance by a cyclized structure, preferably contains, as the aggregate, an aggregate of a compound represented by the following general formula (3):

(3)

A content of the aggregate in the colorant of the present invention is preferably 80 or about 80% or above by mass, with respect to the total amount of the colorant. In such case, securely obtained is a colorant showing translucency to the near infrared light and having a sufficient optical absorbing ability in the visible region.

Also the aggregate preferably has a crystalline property.

Also the colorant of the present invention is preferably constituted by containing a particle of the aggregate.

The particle of the aggregate of the compound of the general formula (2), in which $R^7$ and $R^8$ are ethyl groups, shows, in a powder X-ray diffraction spectrum, diffraction peaks at least in 10.8° or about 10.8°, 11.7° or about 11.7°, 14.5° or about 14.5°, 23.2° or about 23.2°, 25.7° or about 25.7° and 30.5° or about 30.5° in Bragg's angle (2θ±0.2°). The powder X-ray diffraction spectrum can be measured with an X-ray diffraction apparatus (D8 DISCOVER, manufactured by Bruker AXS Inc.), utilizing a Cu target and an X-ray irradiation λ=1.5405 Å.

Also the particle of the aggregate of the compound of the general formula (2), in which $R^7$ and $R^8$ are $—COCH_3$ groups, shows, in a powder X-ray diffraction spectrum, diffraction peaks at least in 14.5° or about 14.5°, 17.5° or about 17.5°, 20.7° or about 20.7°, 21.7° or about 21.7° and 24.3° or about 24.3° in Bragg's angle (2θ±0.2°). The powder X-ray diffraction spectrum can be measured with an X-ray diffraction apparatus (D8 DISCOVER, manufactured by Bruker AXS Inc.), utilizing a Cu target and an X-ray irradiation λ=1.5405 Å.

The particle has a particle size preferably within a range of from 20 or about 20 nm to 300 or about 300 nm. The particle of a particle size within such range can reduce the scattered light from the particle surface to further increase the color density, and can maintain a satisfactory dispersion state in media such as water, a vehicle or a polymer resin, utilizing a dispersant such as an ordinary surfactant.

Also in case of utilizing the colorant of the present invention in an application of an information recording material, the median diameter (d50) of the colorant is preferably within a range of from 50 or about 50 nm to 200 or about 200 nm.

In view of forming the colorant of the present invention as an advantageous black-colored material of a high color density (coloring per unit weight), the molecule having the squarylium skeleton of the invention preferably has a molar absorption coefficient, at the maximum absorption wavelength exhibited at 500 or about 500 nm to 600 or about 600 nm, of 100,000 or about 100,000 or higher.

Also in view of forming the colorant of the present invention as an advantageous black-colored material of a high color density (coloring per unit weight), the molecule having the squarylium skeleton of the invention preferably has a molecular weight of 600 or less.

The molecule of the present invention, having the squarylium skeleton and having the maximum absorption wavelength at 500 to 600 nm in the molecular dispersion state, can be synthesized by a reaction of a donor $D_1H$ or $D_2H$ with 3,4-dihydroxy-3-cyclobutine-1,2-dione (also called "squaric acid" or "quadratic acid") or a reaction with an alcohol ester thereof. Whether it exhibits the maximum absorption wavelength at 500 or about 500 nm to 600 or about 600 nm in the molecular dispersion state can be confirmed, as described above, by dissolving the molecule having the squarylium skeleton in a polar non-aqueous solvent (particularly THF) and measuring the optical absorption spectrum of the solution. The confirmation of the maximum absorption wavelength is preferably executed in a wavelength range of from 300 or about 300 nm to 900 or about 900 nm. A substance having a maximum absorption wavelength at from 500 or about 500 nm to 600 or about 600 nm within such range can be advantageously employed as the molecule of the present invention, having the squarylium skeleton and showing the maximum absorption wavelength at from 500 or about 500 nm to 600 or about 600 nm the molecular dispersion state.

Also the colorant containing the aggregate of the compound represented by the general formula (1) can be obtained as a particle, for example by a following method.

At first, according to a method described in "Cyclotrimethine Dyes Derived from Squaric Acid" (A. Treibs, K. Jacob, Angewandte Chemie International Edition in English, Vol. 4, Issue 8 (1965), p. 694), a pyrrole compound, corresponding to a pyrrole-substituted portion of the structure represented by the general formula (1) and squaric acid are reacted under heating in an organic solvent such as ethanol. A compound obtained by the reaction is dissolved in a hydrophilic organic solvent arbitrarily miscible with water, such as THF, dimethylamine, acetone or ethanol, to prepare a compound solution.

Then, the thus obtained compound solution is injected, for example by a syringe, into ice-cooled distilled water under agitation to obtain a precipitate. In this operation, the particle size of the precipitate can be regulated in a desired range, by controlling the concentration of the compound represented by the general formula (1) in the compound solution, the injection rate of the compound solution, the amount of distilled water, the temperature of distilled water and the agitating speed.

Then the precipitate is separated by filtration, washed with distilled water and dried in vacuum to obtain particles containing the aggregate of the compound represented by the general formula (1). The particles may also be obtained by crushing the compound by various milling apparatuses, as represented by a beads mill.

The colorant of the invention, having a broad absorption band in the visible region and a high color density (coloration per unit weight), is advantageous as a black-colored material and is useful as a black-colored material to be contained in the information recording material.

In the prior electrophotographic black toner for use in a copying machine or the like, carbon black is often used as the pigment. However, carbon black, when added in a large amount, affects the charging property of the toner. On the other hand, a CMY-mixed black or a sintered black perylene-type pigment has a lower color density in comparison with carbon black. In contrast, the colorant of the invention, being capable of exhibiting a gram absorption coefficient in the visible region comparable to that of carbon black, can be used as a substitute material for carbon black, and enables to realize a black-colored toner having a sufficiently high color density in a carbon black-free system or in a low-carbon black system, that has been difficult to realize with the CMY-mixed black or the sintered perylene type black pigment. An exemplary embodiment, utilizing the colorant of the invention as a constituent of black toner, will be described later.

The colorant of the present invention, having a broad absorption band in the visible region and showing a translucency to the near infrared light, can be utilized as a near infrared-transmitting black-colored material in applications to be explained in the following.

As an example, the colorant of the invention can be utilized in the field of document security. A specific example is an image forming method in which a part of characters or an image by carbon black and a remaining part is formed by the colorant of the invention. The image formed by such method merely appears as a "black" character or an image in an ordinary observation, but becomes transparent, when observed with a detector having a sensitivity to the near infrared light only, in the portion of the colorant of the invention, namely in the portion of the near infrared-transmitting black-colored material. The colorant of the invention enables to embed an information code or a concealed character within the "black" image, thereby forming an image excellent in prevention of information leakage.

Also the colorant of the present invention may be utilized as a heat absorption regulating agent in a flash-fixable toner. In case of fixing an image, formed by a black-colored toner containing carbon black and a binder resin, with a flash lamp, the resin temperature may rise excessively when the black-colored toner excessively absorbs the heating ray of the flash lamp. As a result, when an image is formed with colored toners such as of cyan, magenta or yellow color on the same sheet as that of the black-colored toner image, it has been difficult, in the flash fixation, to obtain a uniform fusion level of the resin among the different colors. In contrast, by including the colorant of the invention in the flash-fixable toner, it is rendered possible to regulate the heat absorption amount of the toner while maintaining a sufficiently high black color of the image, thereby sufficiently preventing the excessive rise in the resin temperature at the flash fixation.

The colorant of the present invention is suitable as a heat ray absorption regulating agent of a flash-fixable black-colored toner, containing a polyester resin or a styrene-acrylic resin as the binder resin.

Also the colorant of the present invention may be employed advantageously as a black-colored material for coloring a resin component to be adjoined by a laser transmission welding.

The laser transmission welding is a technology of adjoining resinous components with each other, utilizing a laser light of near infrared region as a heat source. More specifically, a resinous component capable of transmitting the laser light (light-transmitting resinous component) is placed on a resinous component capable of absorbing the laser light (light-absorbing resinous component), and an irradiation with the laser light is executed while a pressure is applied to a plane to be adjoined. The laser light is transmitted by the light-transmitting resinous component, and generates heat in the light-absorbing resinous component, in the vicinity of an interface with the light-transmitting resinous component, whereby the resinous components are molten and adjoined with each other by such heat.

In such laser transmission welding, as a black-colored material to be contained in the light-transmitting resinous component, a dye-based colorant has ordinarily been employed in consideration of the loss in the laser light. In contrast, by including the colorant of the invention in the light-transmitting resinous component, a black coloration, having a superior durability than in dyes, can be obtained with a sufficient color density and without deteriorating the transmission property for the laser light.

Furthermore, the colorant of the present invention may be utilized as a colorant to be contained in a light-shielding film for agricultural use. The agricultural light-shielding film is a black-colored film to be used for covering a ground where an agricultural plant is grown, and has functions of shielding the visible light thereby preventing growth of weeds of transmitting light in the near infrared and infrared regions thereby sufficiently warming the ground.

Furthermore the colorant of the present invention is useful as a black pigment for use in a light-regulating glass, a light-shielding glass, an ink, a paint, an ink for ink jet recording, for coloring rubber or plastics, also for a black matrix, a color filter and for dyeing a spun yarn.

The colorant of the present invention may also be utilized in the form of a thin film. Such thin film, when used in transmitting a light, attenuates the visible light but transmits the infrared light without attenuation. A thin film constituted of the colorant of the invention is advantageous for example an application as an optical filter.

In the following, a preferred exemplary embodiment of a toner, utilizing the colorant of the invention, will be described in detail.

(Toner)

The toner of the present exemplary embodiment is an electrophotographic toner containing the colorant of the invention and a binder resin, together with, if necessary, a colorant other than the colorant of the invention, an infrared absorber, a charge controlling agent and a wax.

The binder resin is not particularly restricted, and thermoplastic resins of various natural or synthetic polymers may be employed. For example, an epoxy resin, a styrene-acrylic resin, a polyamide resin, a polyester resin, a polyvinyl resin, a polyolefin resin, a polyurethane resin or a polybutadiene resin, having a weight-average molecular weight of about from 1,000 to 100,000 and a melting point of from 50 or about 50° C. to 250 or about 250° C., may be employed singly or in a mixture. Among these, a styrene-acrylic resin and a polyester resin are particularly preferable in consideration of a dispersibility of colorant and a heat fixing efficiency.

In the toner of the present exemplary embodiment, in view of obtaining satisfactory charging characteristics and a satisfactory heat fixing efficiency, the proportions of the colorant of the invention and the binder resin are such that the colorant of the invention is preferably contained in an amount of from 1 or about 1 to 15 or about 15 parts by mass with respect to 100 parts by mass of the binder resin, more preferably from 3 or about 3 to 10 or about 10 parts by mass.

The colorant other than the colorant of the invention is not particularly restricted but may be any of a dye and a pigment. For example, in case of a black-colored toner, carbon black or a CMY-mixed black may be used in combination.

A content of the colorant other than the colorant of the invention is preferably from 1 or about 1 to 15 or about 15% by mass, more preferably from 3 or about 3 to 10 or about 10% by mass, with respect to the entire mass of the toner.

The toner of the present exemplary embodiment, when utilized as a flash-fixable toner, may include an infrared absorber. Examples of the infrared absorber include an aluminum salt, an indium oxide-type metal oxide, a tin oxide-type metal oxide, a zinc oxide-type metal oxide, cadmium stannate, a specified amide compound, a naphthalocyanine/phthalocyanine type compound, a cyanine compound, and a lanthanoid compound. Also employable is a black pigment such as carbon black, titanium black, ferrite, magnetite or zirconium carbide. These compounds may be employed singly or as a mixture.

The charge control agent is not particularly restricted so far as it is capable of providing the toner with a charge, but preferably, a quaternary ammonium salt, a nigrosin dye, or a triphenylmethane derivative may be employed as a positive charge control agent, and a naphtholic acid-zinc complex, a salicylic acid-zinc complex, or a boron compound may be employed as a negative charge control agent. An amount of the charge control agent, though dependent on the type thereof, is generally about from 1 to 10% by mass, with respect to the entire mass of the toner.

The wax may be selected widely from natural waxes and synthetic waxes. Examples thereof include petroleum waxes such as paraffin wax and microcrystalline wax; mineral waxes such as Fischer-Tropsch wax and Montan wax; vegetable waxes such as carnauba wax; animal waxes such as bee wax and lanoline; synthetic waxes for example polyolefins such as polyethylene and polypropylene a fatty acid esters amide wax, and denatured polyolefin; and other compounds such as a terpene-type compound and polycaprolactone, and these compounds may be employed singly or in a mixture. An amount of the wax, though dependent on the type thereof, is generally from 1 to 10% by mass with respect to the entire mass of the toner.

In the toner of the present exemplary embodiment, an external additive may be added. As the external additive, ordinarily employed materials may be employed widely, and, for example inorganic fine particles such as of silica, titania, alumina or zinc oxide, hydrophobically treated substance of such inorganic fine particles, and resinous particles such as of polystyrene, PMMA and melamine resin, may be utilized.

The toner of the present exemplary embodiment can be prepared by a method similar to the ordinary toner preparation method. An example of the method will be shown in the following.

In case of preparation with a crushing process, the binder resin, the colorant of the invention and, if necessary, other constituents of the toner such as the colorant other than the colorant of the invention, infrared absorber, wax and charge control agent are mixed and these materials are melt-kneaded by a kneader or an extruder. After the melt-kneaded substance is subjected to a crude crushing, it is fine crushed for example by a jet mill, and is classified by an air classifier to obtain toner particles of a desired particle size. Then the external additive is added to obtain a final toner.

The toner may also be prepared by a polymerization process. In this case, a suspension polymerization process and an emulsion polymerization process are applicable principally. The colorant of the invention may assume a form of a water-dispersed slurry, which is suitable for the emulsion polymerization process. Therefore, the toner of the present exemplary embodiment is particularly preferably a chemical toner, based on an emulsion polymerization process.

In case of preparation with the suspension polymerization process, a monomer composition is prepared by mixing a monomer such as styrene, butyl acrylate, or 2-ethylehxyl acrylate, a cross-linking agent such as divinylbenzene, a chain transfer agent such as dodecylmercaptane, a colorant of the invention, a polymerization initiator, and, when necessitated, a colorant other than the colorant of the invention, a charge control agent, an infrared absorber, and a wax. Then the monomer composition is charged in an aqueous phase containing a suspension stabilizer such as tricalcium phosphate or polyvinyl alcohol and a surfactant, then an emulsion is prepared utilizing a rotor/stator type emulsifier, a high pressure-type emulsifier or an ultrasonic emulsifier, and the monomer is polymerized under heating. After the polymerization, obtained particles are washed and dried, and an external additive is added to obtain the final toner particles.

In case of preparation with the emulsion polymerization process, a monomer such as styrene, butyl acrylate, or 2-ethylehxyl acrylate and if necessary a surfactant such as sodium dodecylsulfate are added in water in which a water-soluble polymerization initiator such as potassium persulfate is dissolved, and the mixture is heated under agitation to execute polymerization thereby obtain resin particles. Thereafter, particles of an infrared absorber and a wax are added to the suspension in which the resin particles are dispersed, and a pH, an agitating speed and a temperature of the suspension are regulated to cause hetero-coagulation of the particles. Then the system is heated to the glass transition temperature of the resin or higher to fuse the hetero-coagulated substance, thereby obtaining final toner particles. The particles may be colored, after the fusion of the hetero-coagulated substance, by mixing a slurry, prepared by dispersing a colorant of the invention and a colorant other than the colorant of the invention in water, and by causing a coagulation with a polyvalent metal coagulant, or at the formation of the hetero-coagulated substance, by causing a coagulation together with a colorant of the invention and a colorant other than the colorant of the invention.

The toner of the present exemplary embodiment may be employed, as it is, as a single-component developer, or as a two-component developer by mixing a carrier. In case of use as the two-component developer, the carrier may be magnetite, ferrite or iron powder as already known.

As the colorant of the present invention has a broad absorption band in the visible wavelength region and a high color density (coloration per unit weight) as described above, the toner of the present exemplary embodiment is suitable as a black-colored toner. Also, the content of the colorant in the toner is generally within a range of from 3 to 10% by mass with respect to the binder resin, but, in the black-colored toner above, a superior visibility in comparison with the CMY-mixed black can be obtained even in case the content of the colorant of the invention is selected as 6.7% by mass or less, with respect to the binder resin. In such case, realizable is a black-colored toner which is excellent in the charging characteristics and has an excellent color density even in a carbon black-free system or in a low-carbon black system.

EXAMPLES

Now the present invention will be clarified further by examples, but the present invention is not limited to such examples.

Example 1

Preparation of Colorant

A solution prepared by dissolving 1-(3,5-dimethyl-4-ethyl-pyrrol-2-yl)-3-(3,5-dimethyl-4-ethyl-pyrrolium-2-ylidene)-cyclobuten-2-one-4-oleate, having ethyl groups as $R^1$ and $R^2$ in the general formula (1) (trade name "SQUARYLIUM ST345", manufactured by Sensient Imaging Technologies GmbH, SynTec Division), at a concentration of 0.5 mM in THF is mixed, in an amount of 40 mL, by a syringe with 2 L of ice-cooled distilled water to obtain a precipitate. After several minutes, the mixture is returned to the room temperature, and the precipitate is separated by filtration, washed with distilled water and dried under vacuum to obtain fine particles (Colorant of Example 1). Also an optical absorption spectrum of a THF solution of SQUARYLIUM ST345 (concentration of SQUARYLIUM ST345: 0.72 mM/L, cell length: 50 μm) is shown in FIG. 1. The optical absorption spectrum is obtained by a measurement with a spectrophotometer U-4100, manufactured by Hitachi Ltd., under conditions of a wavelength range of from 300 to 900 nm and a temperature of 25° C. Based on the absorption spectrum, it is confirmed that SQUARYLIUM ST345 in the molecular dispersion state had a maximum absorption wavelength at 567 nm.

Figure 2:
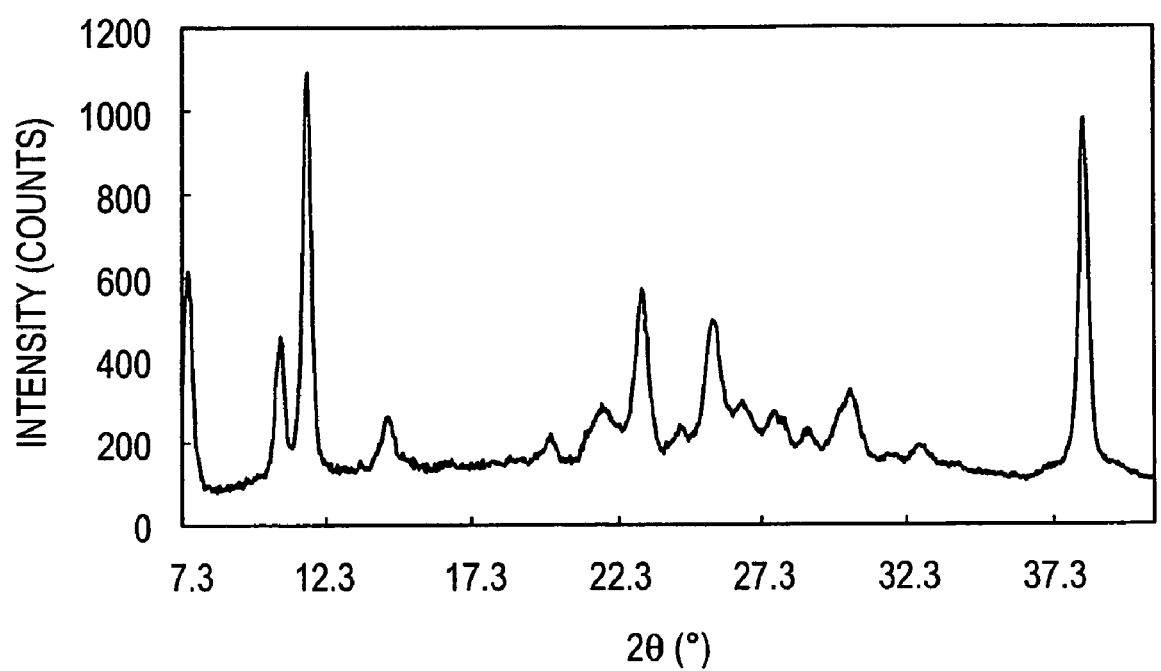
FIG. 2 is a view showing a powder X-ray diffraction spectrum of a colorant obtained in Example 1.

The obtained fine particles are subjected to a powder X-ray diffraction measurement, utilizing an X-ray diffraction apparatus (D8 DISCOVER, manufactured by Bruker AXS Inc.), using a Cu target and an X-ray irradiation of $\lambda=1.5405$ Å. The obtained powder X-ray diffraction spectrum is shown in FIG. 2. The powder X-ray diffraction spectrum confirmed that the fine particles assumed an aggregated state with a high crystallinity.

<Preparation of Slurry>

4.6 mg of the fine particles prepared in Example 1, 23 μL of an aqueous solution of a dispersant, diluted to 12% by mass (dispersant being "TRITON X-100", manufactured by Nacalai Tesque, Inc.) and 2.76 mL of distilled water are mixed and ultrasonic dispersed by an ultrasonic homogenizer (VC-130, Sonics & Materials Inc.) (ultrasonic output: 4-5 W, with a ¼-inch horn and with an irradiation time of 30 minutes) to obtain a slurry. The colorant concentration in the slurry is 0.165% by mass. Also the particle size of the colorant in the slurry, as represented by a median diameter (d50) is measured with a particle size distribution meter (MICROTRAK UPA9230). The obtained median diameter (d50) of the fine particles is 185 nm.

<Measurement of Transmission Spectrum of Slurry>

Figure 3:
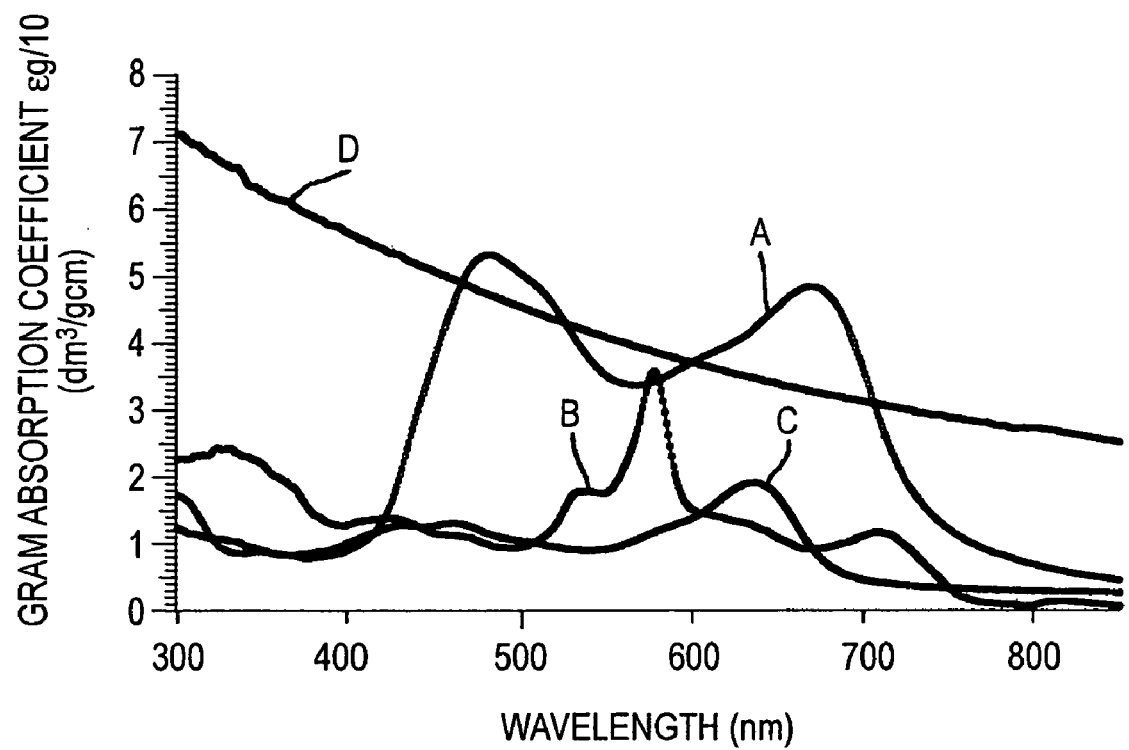
FIG. 3 is a graph showing a gram absorption coefficient of a slurry, containing the colorant obtained in Example 1.

The slurry obtained above is subjected to the measurement of a transmission spectrum in a range of from 300 to 800 nm, by a spectrophotometer (U-4100, manufactured by Hitachi Ltd.). The obtained transmission spectrum, converted into an optical absorbing ability per unit weight (gram absorption coefficient) of the colorant, contained in the slurry, is shown in FIG. 3. In FIG. 3, A indicates a graph of the slurry containing the fine particles obtained in Example 1. For the purpose of comparison, FIG. 3 also shows the graphs on slurries of a CMY-mixed black (B in FIG. 3), a perylene black (C in FIG. 3) and carbon black (D in FIG. 3).

The slurries of CMY-mixed black, perylene black and carbon black are prepared in the same manner as the aforementioned slurry, except that the fine particles obtained in Example 1 are respectively replaced by following colorants CMY-mixed black: a mixture of commercially available cyan, magenta and yellow pigments in such a proportion that appears most black in visual evaluation, having a particle size d50=134 nm;

perylene black: trade name VARIOGEN BLACK S0084, manufactured by BASF Aktiengesellshaft, having a particle size d50=200 nm;

carbon black: commercially available black pigment for toner, having a particle size d50=134 nm.

As illustrated in FIG. 3, the slurry containing the fine particles obtained in Example 1 had a broad absorption band over the visible region, thus confirming that the colorant of Example 1 is usable as a black-colored material. It is also confirmed that the slurry containing the fine particles obtained in Example 1 had a gram absorption coefficient, in the visible region, higher than that of CMY-mixed black and perylene black and comparable to that of carbon black. Based on this fact, it is found that the information recording material could be made black by the colorant of Example 1 with a smaller amount, in comparison with the CMY-mixed black and the perylene black. It is also confirmed that the slurry, containing the fine particles obtained in Example 1, had a lower absorption (higher transmittance) for the near infrared light (light of a wavelength region longer than 800 nm)

<Measurement-1 of Optical Density and Chroma>

The slurry containing the colorant obtained in Example 1 (colorant concentration: 0.165% by mass) is supported, in an amount of 33 µL, by surface tension between two films at a distal end of a constant-amount brush. Then the constant-amount brush is made to slide on an evaluation paper (PICTORICO photo gloss paper for pigment ink) to obtain a coated paper, containing the slurry coated on the evaluation paper (coated area: 1.1×1.1 cm). The coated papers, respectively having the coated amounts of the colorant of 0.1, 0.2, 0.3, 0.4 and 0.5 g/m² in a number of grams per square meter (PMA), are prepared by changing the amount of slurry held in the brush. The prepared coated papers are subjected to measurements of an optical density OD and a chroma c* in the coated area, utilizing a spectrodensitometer (trade name "X-RITE 939", manufactured by X-rite Co.). For the purpose of comparison, coated papers, coated with the aforementioned slurry of CMY-mixed black, are prepared in a similar manner and subjected to measurements. Obtained results are shown in FIGS. 4A and 4B.

Figure 4A:
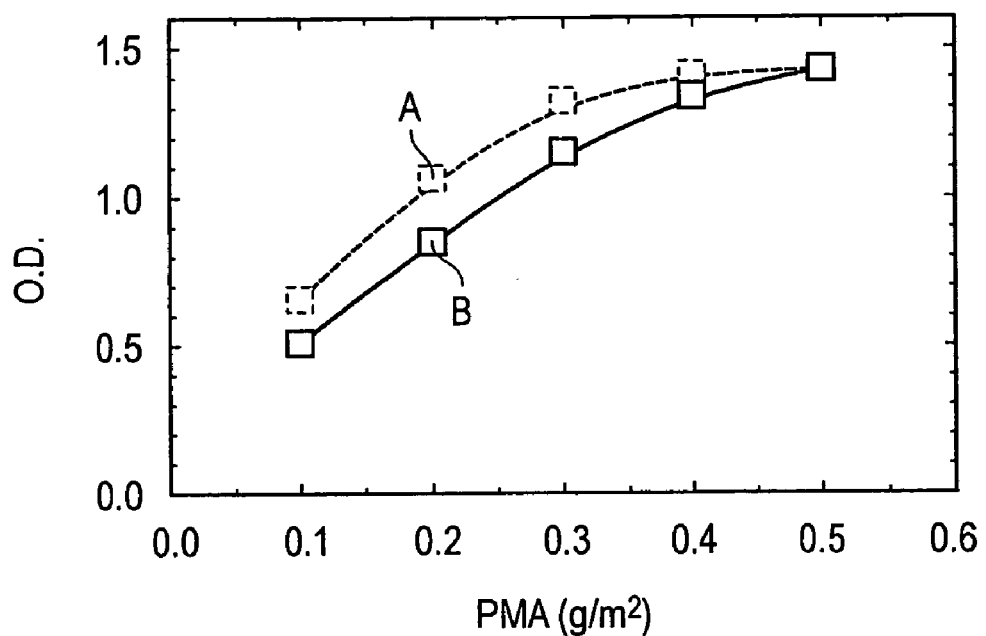
FIGS. 4A and 4B are graphs showing a relationship among colorant amount, optical density and chroma, on a paper coated with the slurry, containing the colorant obtained in Example 1.
Figure 4B:
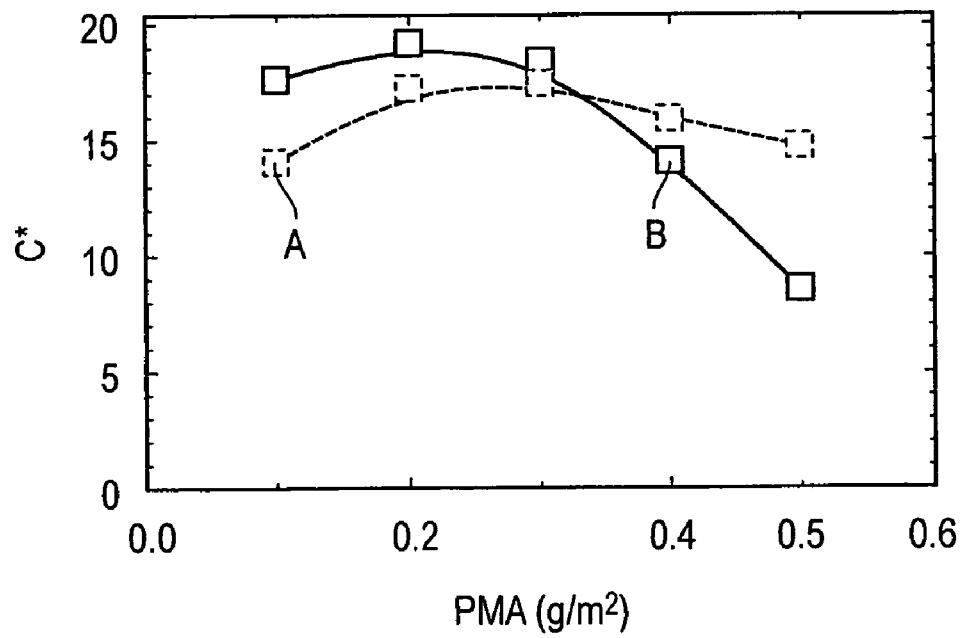

As illustrated in FIGS. 4A and 43 it is confirmed that, in a PMA range of from 0.1 to 0.5 g/m², the slurry containing the colorant obtained in Example 1 had a higher optical density OD (higher color density) than the slurry of CMY-mixed black. It is also confirmed, as to the chroma c*, that both are comparable. Based on these, it is found that the colorant of Example 1 could make the information recording material black with a smaller amount, in comparison with the CMY-mixed black.

<Measurement-2 of Optical Density and Chroma>

The optical density and the chroma are evaluated in the following manner, assuming a case of utilizing the colorant, obtained in Example 1, as a constituent of toner.

At first, a slurry containing a colorant, obtained in a similar manner as in Example 1, and an aqueous styrene-acrylic resin dispersion (aqueous solution prepared by dispersing, at a proportion of 40% by mass, a resin prepared by emulsion polymerization of styrene, n-butyl acrylate and acrylic acid) are mixed, and polyaluminum chloride as a coagulant is further added and mixed under agitation to prepare a mixed dispersion. The mixed dispersion is filtered by and deposited on a filter paper (trade name "GSWP04700", pore diameter: 220 nm, manufactured by Millipore Corp.), and the deposit is heat pressed at 120° C. form a resin film on the filter paper, thereby obtaining an evaluation sample. This sample corresponds to a toner, constituted of a colorant and a binder resin, printed in a solid state. The evaluation sample is prepared in plural units, by regulating the amounts of the colorant and the styrene-acrylic resin latex contained in the mixture dispersion. More specifically, the total (mass of solid) of the colorant and the styrene-acrylic resin latex is fixed at a number of grams per square meter (PMA) at 4.5 g/m², and the samples are prepared with resin films respectively of colorant amounts (PMA) of 0.15, 0.30 and 0.45 g/m² (respectively corresponding to the colorant contents of 3.3, 6.7 and 10% by mass with respect to the resin). The prepared evaluation samples are subjected to the measurements of optical density OD and chroma c*, utilizing a spectrodensitometer (trade name "X-RITE 939", manufactured by X-rite Co.). For the purpose of comparison, evaluation samples are similarly prepared with the aforementioned slurry of CMY-mixed black, and subjected to measurements. Obtained results are shown in FIGS. 5A and 5B.

Figure 5A:
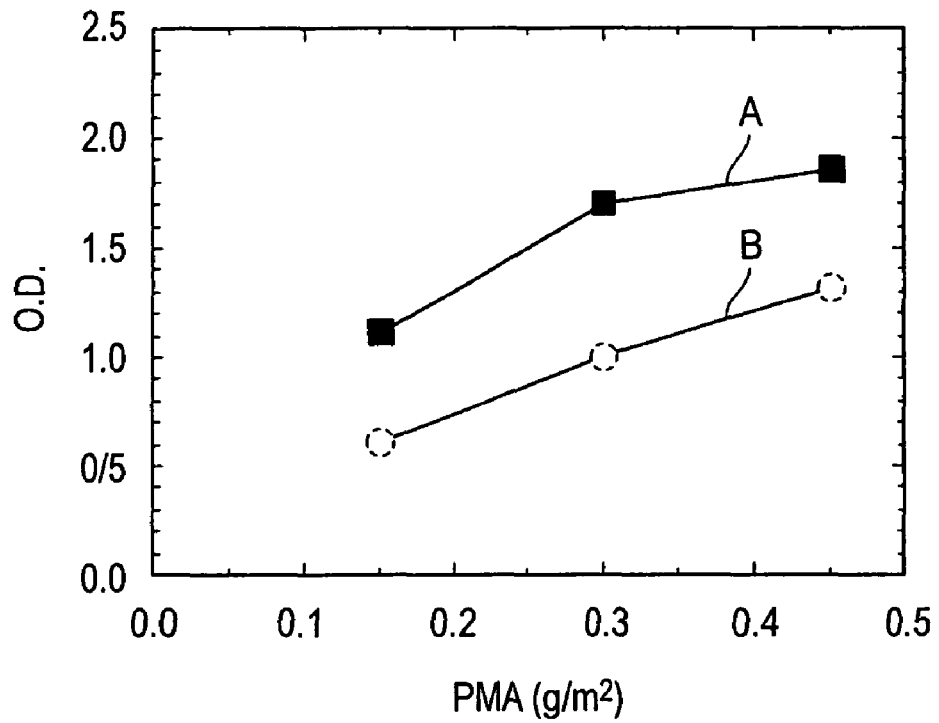
FIGS. 5A and 5B are graphs showing a relationship among colorant amount, optical density and chroma, on a paper provided with a resin film, in which the colorant obtained in Example 1 is dispersed.
Figure 5B:
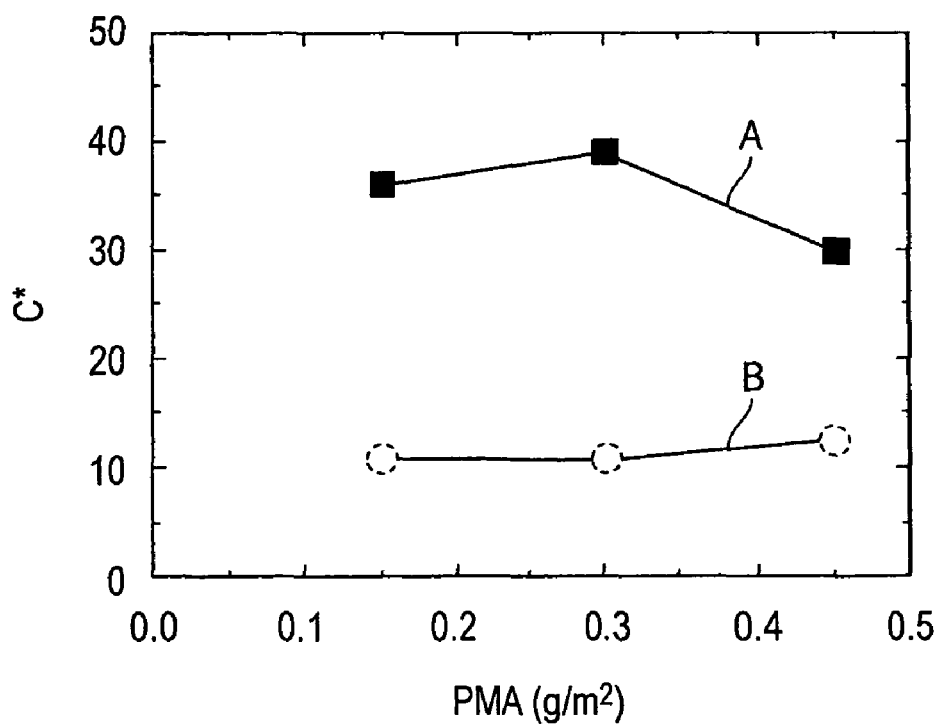

As illustrated in FIGS. 5A and 5B, it is confirmed that, in a PMA range of from 0.15 to 0.45 g/m², the evaluation samples utilizing the colorant obtained in Example 1 had a much higher optical density OD (higher color density) than in the case of employing the CMY-mixed black. On the other hand, the chroma c* is inferior in comparison with the case of utilizing CMY-mixed black. However, the evaluation sample utilizing the colorant of Example 1 appeared "more black", in visual evaluation, than that utilizing the CMY-mixed black. This can be considered to be exhibited by the extremely high optical density, expressed when the colorant of Example 1 is employed as the colorant of the toner.

Also in the evaluation samples utilizing the colorant obtained in Example 1, the optical density OD exceeded 1.5 when the colorant amount PMA in the resin film is 0.3 g/m² (corresponding to a colorant content of 6.7% by mass with respect to the resin). This indicates that, in case of utilizing the colorant of Example 1 as the colorant of black-colored toner, a sufficient coloring can be obtained even with a colorant content of 6.7% by mass with respect to the resin, whereby a black-colored toner having a sufficient visibility can be realized effectively.

<Measurement of Reflection Spectrum of Resin Film>

Figure 6:
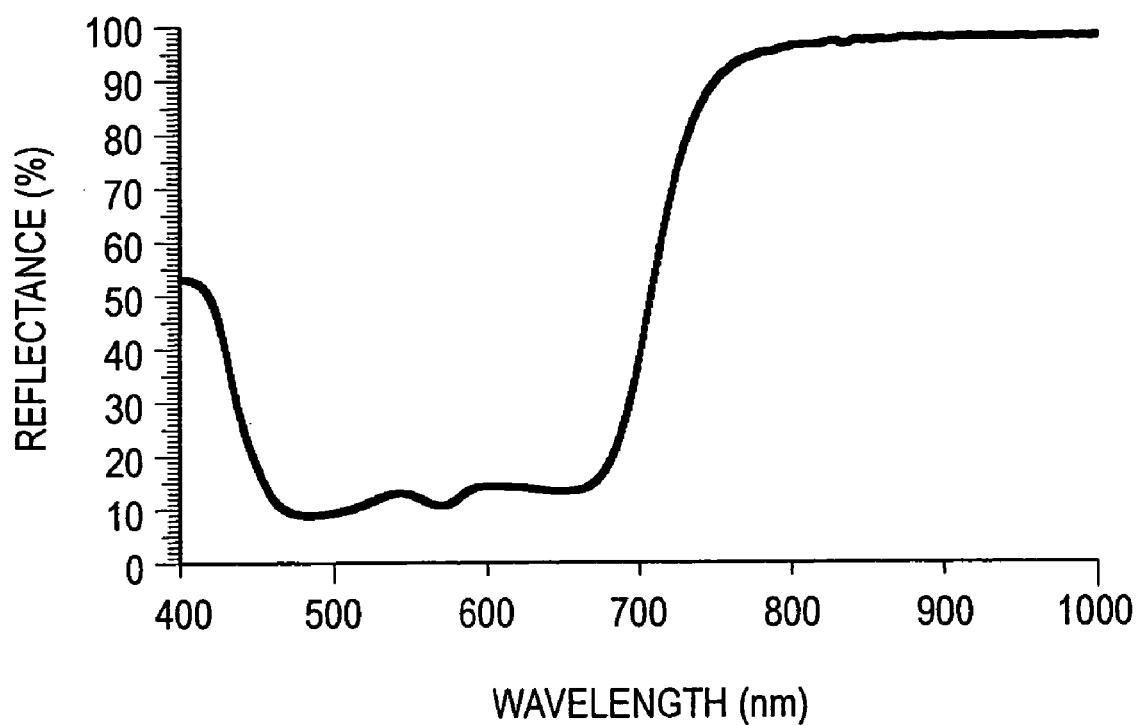
FIG. 6 is a view showing a reflection spectrum of a paper provided with a resin film, in which the colorant obtained in Example 1 is dispersed.

Among the evaluation samples utilizing the colorant obtained in Example 1, one having the colorant amount PMA of 0.3 g/m² in the resin film (corresponding to a colorant content of 6.7% by mass with respect to resin) is subjected to a measurement of reflection spectrum. The obtained reflection spectrum is shown in FIG. 6. The reflection spectrum, shown in FIG. 6, indicates how the toner appears, when the colorant of Example 1 is utilized as a colorant of a black-colored toner. As illustrated in FIG. 6, the evaluation sample utilizing the colorant obtained in Example 1 has a low reflectance in the visible region, thus appearing in black color in visual observation, but shows a larger reflectance in a near infrared region at the longer wavelength side of 800 nm (namely lower absorption for near infrared light), and this fact indicates that the resin film has a translucency to the near infrared light.

Example 2

Preparation of Colorant

A compound 1-(3,5-dimethyl-pyrrol-2-yl)-3-(3,5-dimethyl-pyrrolium-2-ylidene)-cyclobuten-2-one-4-oleate, having hydrogen atoms as $R^7$ and $R^8$ in the general formula (2), is synthesized according to the method described in Angewandte Chemie International Edition in English, Vol. 4, Issue 8 (1965), p. 694. More specifically, 0.63 grams (5.2 mmols) of squaric acid (3,4-dihydroxy-3-cyclobutene-1,2-dione, manufactured by Kyowa Hakko Kogyo Co.) and 1 g (10.5 mmols) of 2,4-dimethylpyrrole (trade name D2848, manufactured by Tokyo Chemical Industry Co.) are dissolved in 50 mL of ethanol and is subjected to an azeotropic refluxing for 7 hours. Thereafter, the precipitate formed by reaction is collected by filtration, rinsed with ethanol and water, to obtain crude crystals. The crude crystals are purified by recrystallization from ethanol to a compound 1-(3,5-dimethyl-pyrrol-2-yl)-3-(3,5-dimethyl-pyrrolium-2-ylidene)-cyclobuten-2-one-4-oleate, having hydrogen atoms as $R^7$ and $R^8$ in the general formula (2) (hereinafter referred to as a compound 2).

Figure 7:
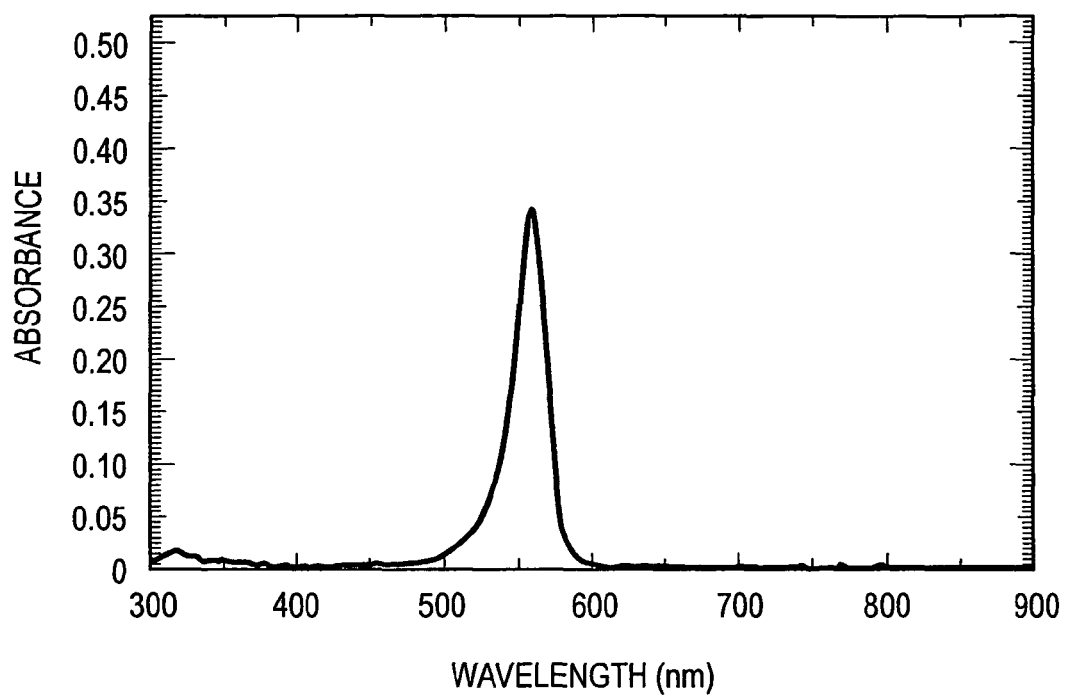
FIG. 7 is a view showing an optical absorption spectrum of a THF solution of a compound 2, synthesized in Example 2.

Then a solution, prepared by dissolving the above compound 2 at a concentration of 0.5 mM in THF is mixed, in an amount of 40 mL, by a syringe with 2 L of ice-cooled distilled water to obtain a precipitate. After several minutes, the mixture is returned to the room temperature, and the precipitate is separated by filtration, washed with distilled water and dried under vacuum to obtain fine particles (colorant of Example 2). Also an optical absorption spectrum of a THF solution of the compound 2 obtained above (concentration of compound: 0.45 mM/L, cell length: 50 W) is shown in FIG. 7. The optical absorption spectrum is obtained by a measurement with a spectrophotometer U-4100, manufactured by Hitachi Ltd., under conditions of a wavelength range of from 300 to 900 nm and a temperature of 25° C. Based on the absorption spectrum, it is confirmed that the compound 2 in the molecular dispersion state had a maximum absorption wavelength at 559 mm.

<Preparation of Slurry>

4.6 mg of the fine particles prepared in Example 2, 23 µl, of an aqueous solution of dispersant, diluted to 12% by mass (dispersant being "TRITON X-100", manufactured by Nacalai Tesque, Inc.) and 2.76 mL of distilled water are mixed and ultrasonic dispersed by an ultrasonic homogenizer (VC-130, Sonics & Materials Inc.) (ultrasonic output: 4-5 W, with a ¼-inch horn and with an irradiation time of 30 minutes) to obtain a slurry. The colorant concentration in the slurry is 0.165% by mass.

The slurry obtained above is subjected to the measurement of a transmission spectrum in a range of from 300 to 850 nm, by a spectrophotometer (U-4100, manufactured by Hitachi Ltd.). The obtained transmission spectrum, converted into an optical absorbing ability per unit weight (gram absorption coefficient) of the colorant, contained in the slurry, is shown in FIG. 8.

Figure 8:
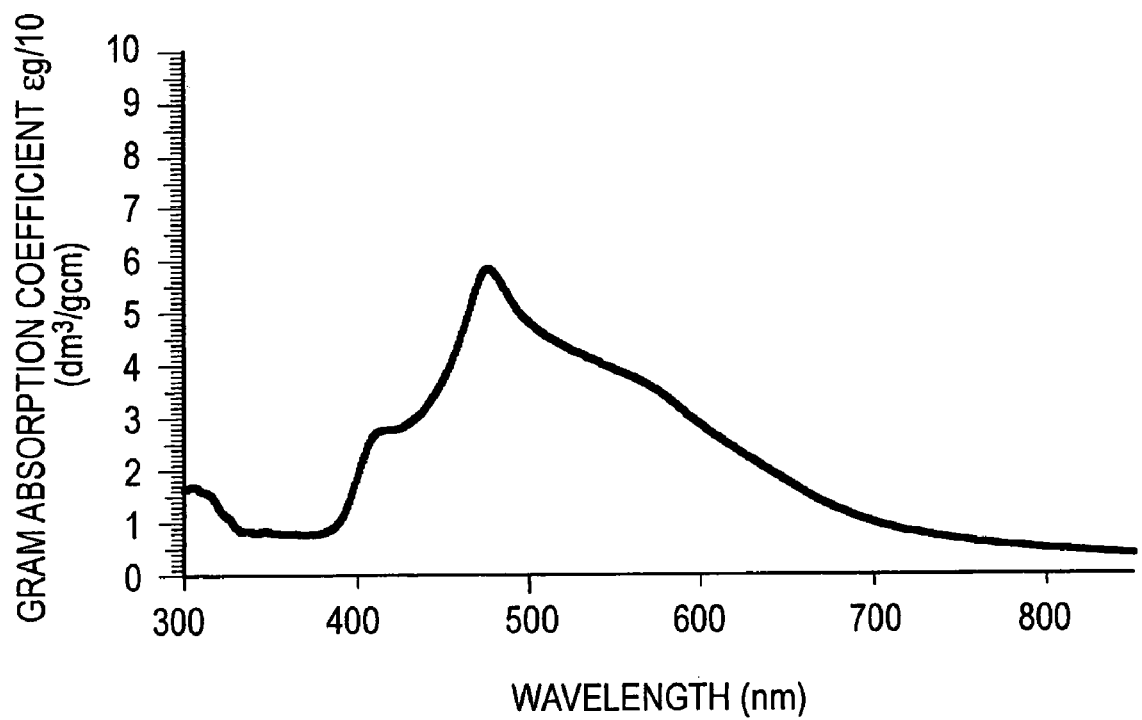
FIG. 8 is a graph showing a gram absorption coefficient of a slurry, containing the colorant obtained in Example 2.

As shown in FIG. 8, the slurry containing the fine particles obtained in Example 2 is found to have a broad absorption band in the visible region. It is also confirmed that the absorbance is lower in the near infrared region (light of a wavelength region longer than 800 nm) (namely a large transmission for the near infrared light).

Example 3

Preparation of Colorant

A mixture of 121 mg (1.0 mmol) of 4,5,6,7-tetrahydroindole (manufactured by Aldrich Inc.), 57 mg (0.5 mmol) of 3,4-dihydroxy-3-butene-1,2-dione (manufactured by Kyowa Hakko Kogyo Co., Ltd.) and 10 ml of ethanol is agitated at the room temperature and reacted for 268 hours. After the reaction, a filtrate obtained by a suction filtration of the reaction solution to separate a black-green-brown precipitate and a filtrate obtained by washing the black-green-brown precipitate with ethanol are mixed to obtain a red-purple-colored filtrate. Then the obtained filtrate is concentrated by distillation under a reduced pressure to obtain a black-purple-colored solid. Then the obtained solid is purified by a high-speed column chromatography (filled with neutral silica gel, developing solvent: hexane and acetone (a solvent mixture with a volume ratio of from 4:1 to 1:1)) to obtain 8 mg (yield 50%) of a compound represented by the general formula (3) (black-purple-colored solid) (hereinafter called "compound 3").

Figure 9:
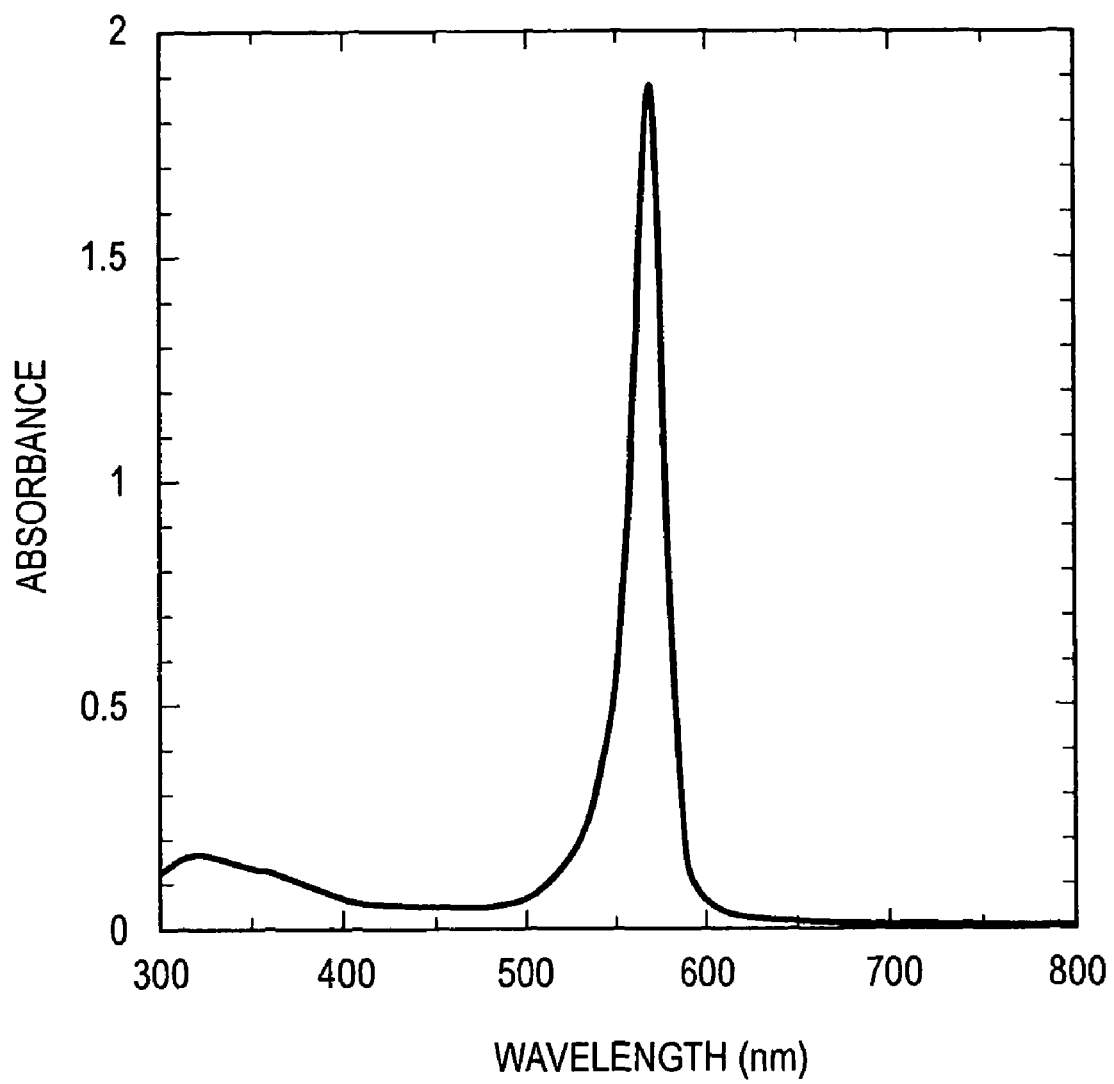
FIG. 9 is a view showing an optical absorption spectrum of a THF solution of a compound 3, synthesized in Example 3.

Then, 3.37 mg of the compound 3 obtained above are dissolved in 40 mL of THF. The obtained solution is poured by a syringe into 2 L of distilled water under vigorous agitation (1400 rpm) with a magnetic stirrer. In succession, 32 g of NaCl are added to obtain a precipitate by agglomeration. The precipitate is separated by filtration, washed with distilled water, and dried under vacuum to obtain fine particles (colorant of Example 3). The optical absorption spectrum of the THF solution of the compound 3 obtained above is shown in FIG. 9. The optical absorption spectrum is obtained by a measurement with a spectrophotometer U-4100, manufactured by Hitachi Ltd., under conditions of a wavelength range of from 300 to 900 nm and a temperature of 25° C. Based on the absorption spectrum, it is confirmed that the compound 3 in the molecular dispersion state had a maximum absorption wavelength at 569 m.

<Preparation of Slurry>

1.58 mg of the fine particles obtained in Example 3, 19.4 µl it of an aqueous solution of a dispersant, diluted to 12% by mass (dispersant being "TRITON X-100", manufactured by Nacalai Tesque, Inc.) and 2.332 g of distilled water are mixed and ultrasonic dispersed by an ultrasonic homogenizer (VC-130, Sonics & Materials Inc.) (ultrasonic output: 4 W, with a ¼-inch horn and with an irradiation time of 75 minutes, under ice cooling) to obtain a slurry. The colorant concentration in the slurry is 0.067% by mass. Also the particle size of the colorant in the slurry, as represented by a median diameter (d50), is measured with a particle size distribution meter (MICROTRAK UPA9230). The obtained median diameter (d50) of the fine particles is 966 nm.

<Measurement of Optical Density and Chroma>

The colorant obtained in Example 3 is evaluated on optical density and chroma by the following procedure, assuming the case of use as a constituent of a toner.

At first, 643 µL of the slurry containing the colorant obtained in Example 3 (colorant concentration: 0.067% by mass), 15 μL of an aqueous dispersion of a styrene-acrylic resin latex (aqueous solution prepared by dispersing, at a proportion of 40% by mass, a resin prepared by emulsion polymerization of styrene, n-butyl acrylate and acrylic acid utilizing a surfactant), and 5 g of water are mixed, and the mixture is subjected to a dispersion process by Ultratarax to obtain a mixed slurry. Polyaluminum chloride as a coagulant is further added thereto and mixed under agitation to obtain a mixed dispersion (pseudo toner dispersion). The mixed dispersion is filtered by and deposited on a filter paper (trade name "GSWP04700", manufactured by Millipore Corp., pore diameter: 220 nm), and the deposit is heat pressed at 120° C. to form a resin film on the filter paper, thereby obtaining an evaluation sample. The evaluation sample had a resin film, having a total amount (solid mass) of the colorant and the styrene-acrylic resin latex, in grams per square meter (PMA), of 4.5 g/m², and a colorant amount (PMA) of 0.30 g/m² (corresponding to a content of colorant to resin of 6.7% by mass). The prepared evaluation sample is subjected to the measurements of optical density OD and chroma c*, utilizing a spectrodensitometer (trade name "X-RITE 939", manufactured by X-rite Co.). Obtained results are shown in Table 1.

TABLE 1

| optical density OD | L* | c* |
|---|---|---|
| 0.95 | 40 | 35.2 |

<Measurement of Reflection Spectrum of Resin Film>

Figure 10:
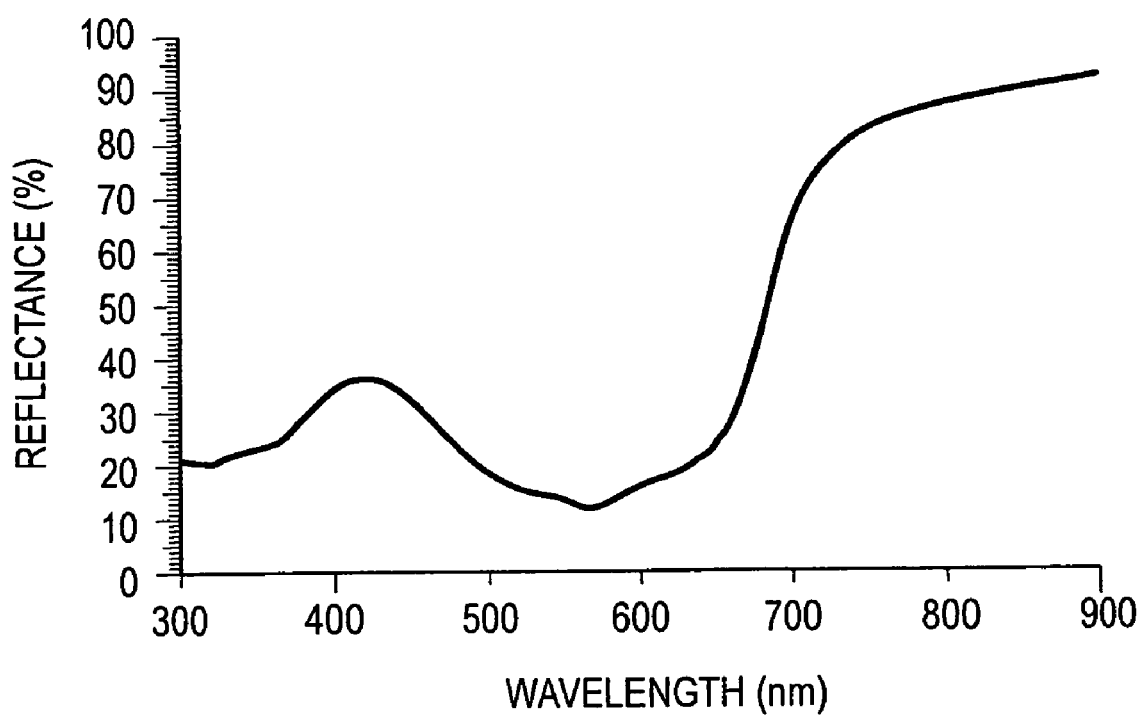
FIG. 10 is a view showing a reflection spectrum of a paper provided with a resin film, in which the colorant obtained in Example 3 is dispersed.

The evaluation sample utilizing the colorant obtained in Example 3 is subjected to a measurement of reflection spectrum. The obtained reflection spectrum is shown in FIG. 10. The evaluation sample utilizing the colorant obtained in Example 3, as shown in FIG. 10, had a low reflectance in the visible region, thus appearing in black color in visual observation, but shows a larger reflectance in a near infrared region at the longer wavelength side of 800 n=(namely lower absorption for near infrared light), and this fact indicates that the resin film has a translucency to the near infrared light.

Example 4

Preparation of Colorant

A compound 1-(3,5-dimethyl-4-acetyl-pyrrol-2-yl)-3-(3, 5-dimethyl-4-acety 1-pyrrolium-2-ylidene)-cyclobuten-2-one-4-oleate, having —COCH₃ groups as R⁷ and R³ in the general formula (2), is synthesized in the following procedure. At first, a solution of 1 g (7.3 mmol) of 3-acetyl-2,4-dimethylpyrrole (manufactured by Acros Organics, purity: 98%) and 0.438 g (3.6 mmol) of squaric acid (3,4-dihydroxy-3-cyclobutene-1,2-dione, manufactured by Kyowa Hakko Kogyo Co.) in 70 mL of ethanol is reacted for 2.5 hours under a dehydrating refluxing condition (78.2° C.). After the reaction liquid is returned to the room temperature, the reaction product is collected by filtration, rinsed with ethanol, water, and an ethanol/ether mixture in this order to obtain crude crystals. The crude crystals are purified by recrystallization from ethanol to obtain a compound of the general formula (2) in which R⁷ and R⁸ are both —COCH₃ groups (hereinafter called "compound 4"). The yield is 60%.

Figure 11:
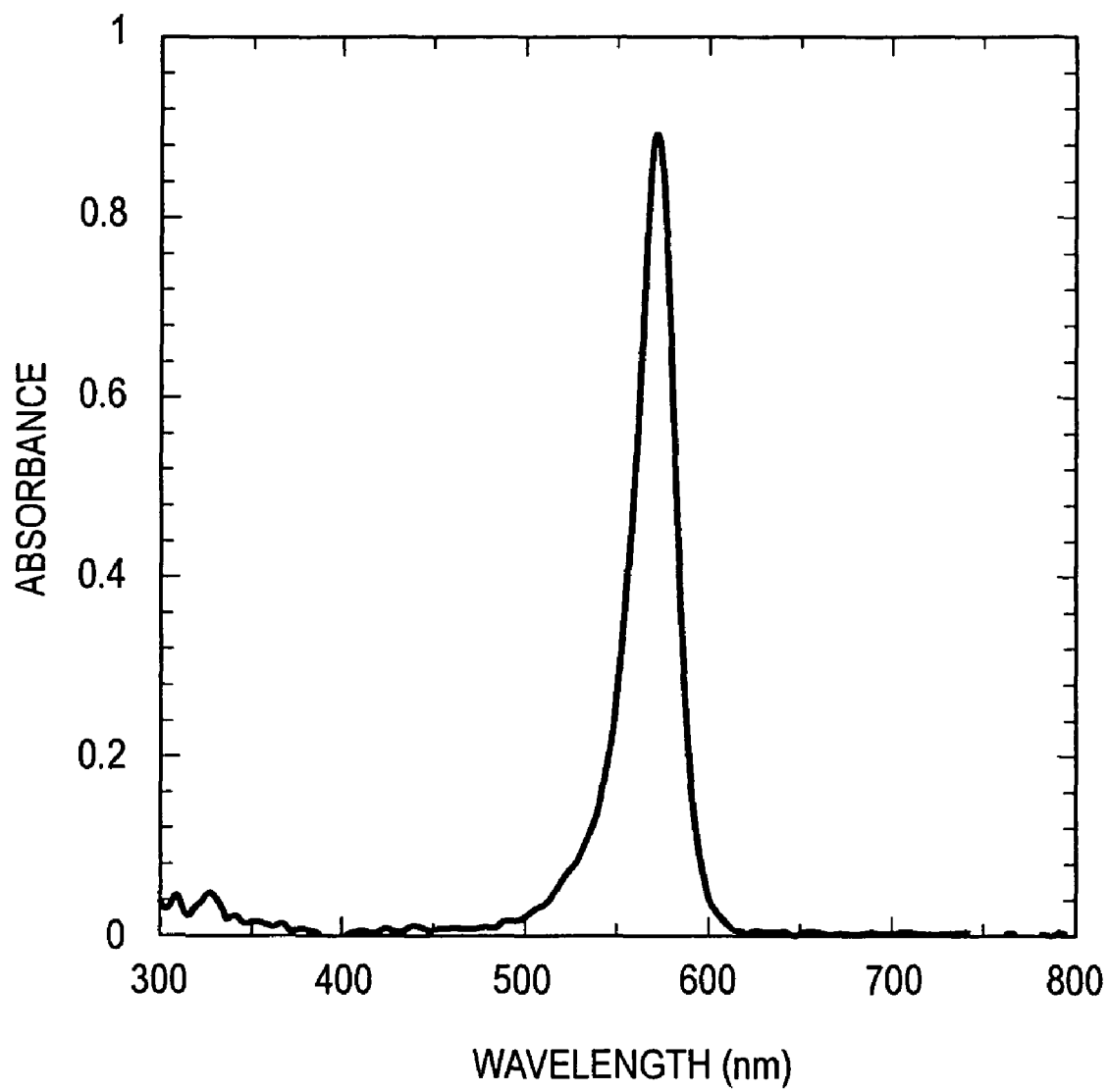
FIG. 11 is a view showing an optical absorption spectrum of a THF solution of a compound 4, synthesized in Example 4.
Figure 12:
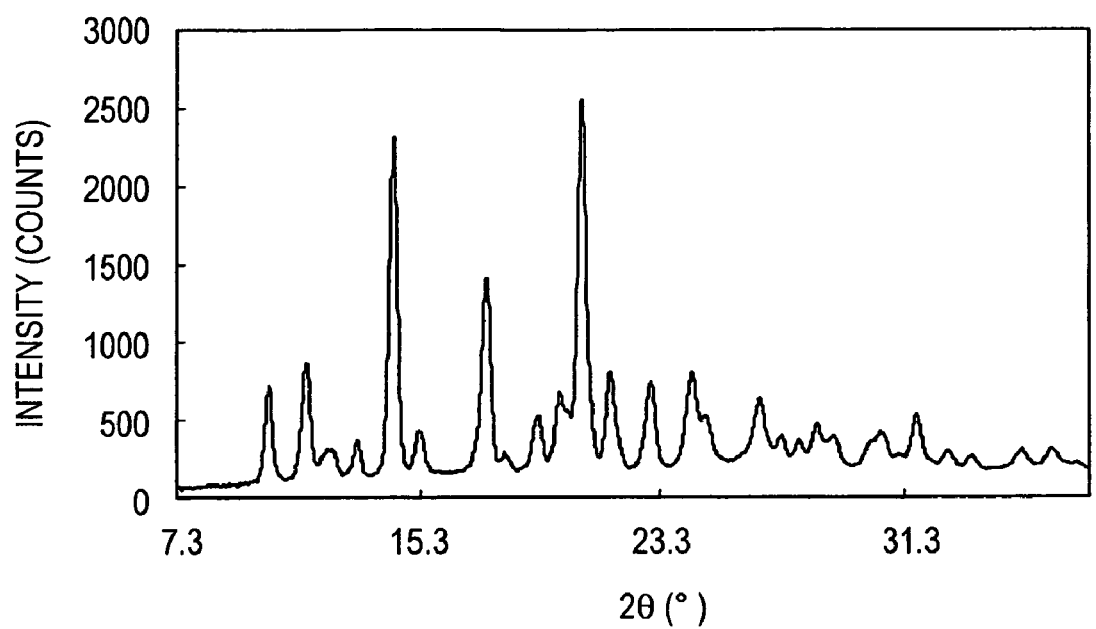
FIG. 12 is a view showing a powder X-ray diffraction spectrum of a colorant synthesized in Example 4.

Then a solution, prepared by dissolving 99.6 mg of the compound 4 obtained above in 1 mL of THF, and 20 g of zirconia beads of a diameter of 1 mm are charged in a container for a planet ball mill, and subjected to a milling process at 600 rpm for 1 hour. After water is added to the planet ball mill container, the content is filtered with a 50 nm filter to obtain a colorant of Example 4. An optical absorption spectrum of a THF solution of the compound 4 obtained above (concentration of compound: 0.0043 mM/L, cell length: 0.2 cm) is shown in FIG. 11. The optical absorption spectrum is obtained by a measurement with a spectrophotometer U-4100, manufactured by Hitachi Ltd., under conditions of a wavelength range of from 300 to 900 nm and a temperature of 25° C. Based on the absorption spectrum, it is confirmed that the compound 4 in the molecular dispersion state had a maximum absorption wavelength at 572 n=Also the colorant of Example 4 is subjected to a powder X-ray diffractometry. The obtained powder X-ray diffraction spectrum is shown in FIG. 12. It is confirmed from the obtained powder x-ray diffraction spectrum that the fine particles assumed an aggregate state of a high crystallinity.

<Preparation of Slurry>

4.95 mg of the colorant obtained in Example 4, 24 μl of an aqueous solution of dispersant, diluted to 12% by mass (dispersant being "TRITON X-100", manufactured by Nacalai Tesque, Inc.) and 2.88 mL of distilled water are mixed and ultrasonic dispersed by an ultrasonic homogenizer (VC-130, Sonics & Materials Inc.) (ultrasonic output: 4 W, with a ¼-inch horn and with an irradiation time of 60 minutes, under ice cooling) to obtain a slurry. The colorant concentration in the slurry is 0.165% by mass. Also the particle size of the colorant in the slurry, as represented by a median diameter (d50), is measured with a particle size distribution meter (HORIBA LB-550). The obtained median diameter (d50) of the fine particles is 83 nm.

<Measurement of Optical Density and Chroma>

The colorant obtained in Example 4 is evaluated on optical density and chroma by the following procedure, assuming the case of use as a constituent of a toner.

At first, 261 μL of the slurry containing the colorant obtained in Example 4 (colorant concentration: 0.165% by mass), 15 μL of an aqueous dispersion of a styrene-acrylic resin latex (aqueous solution prepared by dispersing, at a proportion of 40% by mass, a resin prepared by emulsion polymerization of styrene, n-butyl acrylate and acrylic acid utilizing a surfactant), and 5 g of water are mixed, and the mixture is subjected to a dispersion process by Ultratarax to obtain a mixed slurry. Polyaluminum chloride as a coagulant is further added thereto and mixed under agitation to obtain a mixed dispersion (pseudo toner dispersion). The mixed dispersion is filtered by and deposited on a filter paper (trade name "GSWP04700", manufactured by Millipore Corp., pore diameter: 220 nm), and the deposit is heat pressed at 120° C. to form a resin film on the filter paper, thereby obtaining an evaluation sample. The evaluation sample had a resin film, having a total amount (solid mass) of the colorant and the styrene-acrylic resin latex, in grams per square meter (PMA), of 4.5 g/m², and a colorant amount (PMA) of 0.30 g/m² (corresponding to a content of colorant to resin of 6.7% by mass). The prepared evaluation sample is subjected to the measurements of optical density OD and chroma c*, utilizing a spectrodensitometer (trade name "X-RITE 939", manufactured by X-rite Co.). Obtained results are shown in Table 2.

TABLE 2

| optical density OD | L* | c* |
|---|---|---|
| 1.33 | 25.1 | 54.4 |

<Measurement of Reflection Spectrum of Resin Film>

Figure 13:
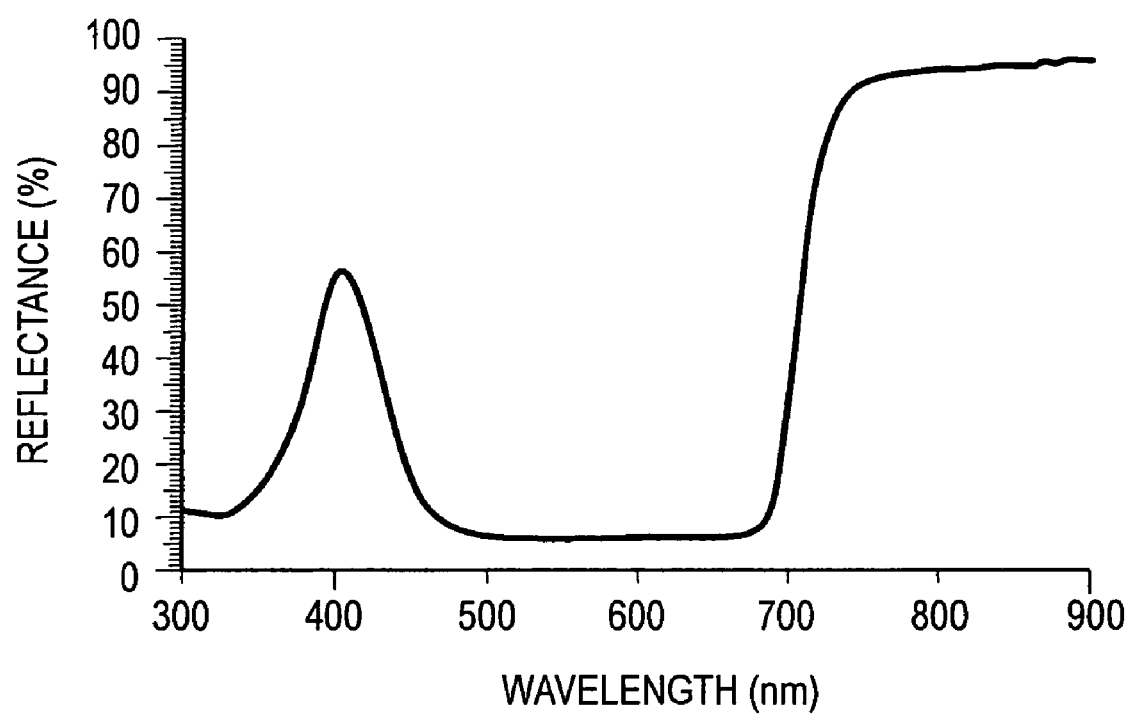
FIG. 13 is a view showing a reflection spectrum of a paper provided with a resin film, in which the colorant obtained in Example 4 is dispersed.

The evaluation sample utilizing the colorant obtained in Example 4 is subjected to a measurement of reflection spectrum. The obtained reflection spectrum is shown in FIG. 13. The evaluation sample utilizing the colorant obtained in Example 4, as shown in FIG. 13, had a low reflectance in the visible region, thus appearing in black color in visual observation, but shows a larger reflectance in a near infrared region at the longer wavelength side of 800 nm (namely lower absorption for near infrared light), and this fact indicates that the resin film has a translucency to the near infrared light.

Comparative Example 1

Figure 14:
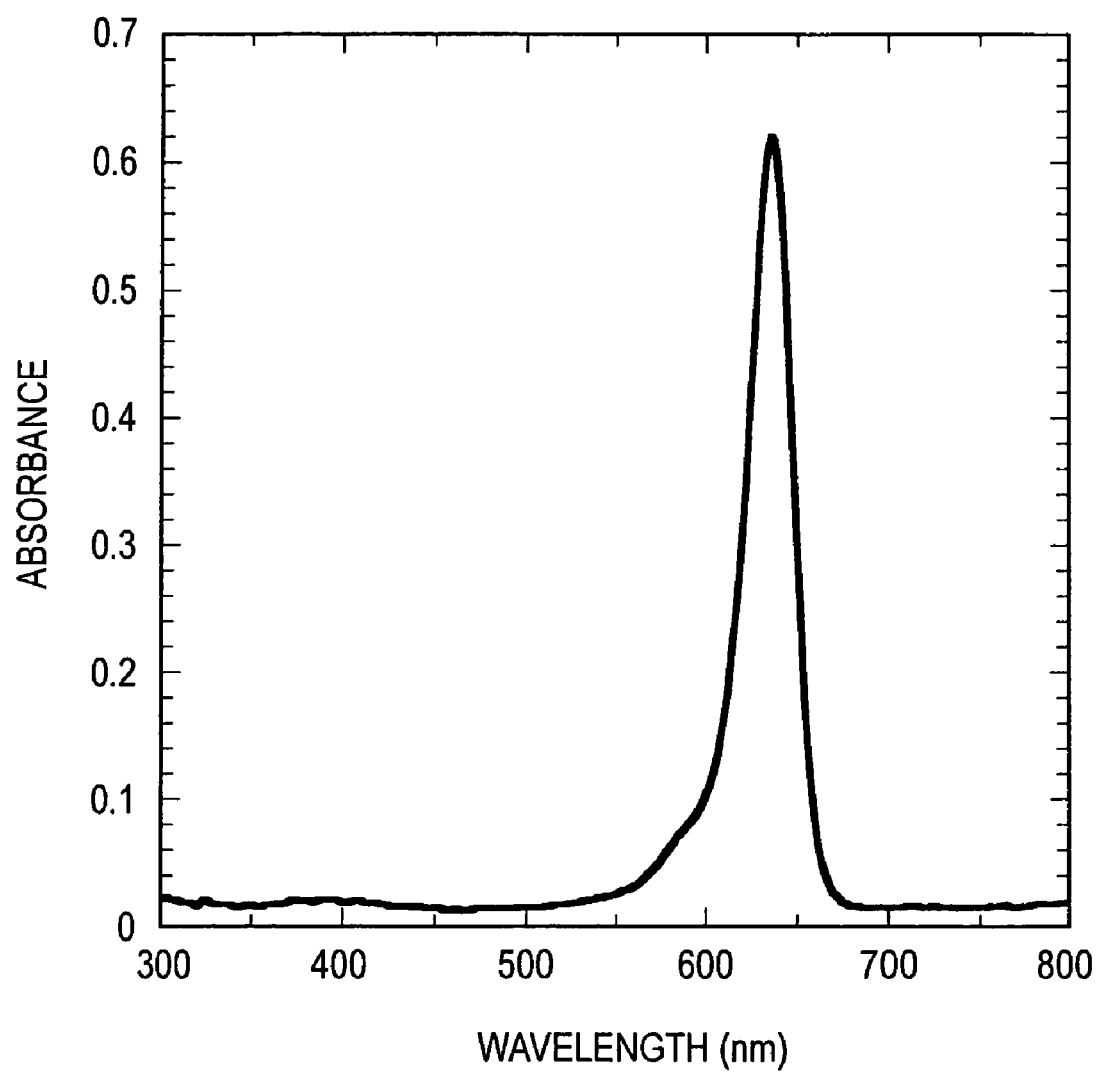
FIG. 14 is a view showing an optical absorption spectrum of a THF solution of a comparative compound 1.

A compound 1,3-bis[4-(dimethylamino)-2-hydroxyphenyl]-2,4-dihydroxycyclo butenediylium dihydroxide, bis(innersalt) (manufactured by Aldrich Inc.) (hereinafter called "Comparative Compound 1"), is prepared. An optical absorption spectrum of a THF solution of the comparative compound 1 is shown in FIG. 14, The optical absorption spectrum is obtained by a measurement with a spectrophotometer U-4100, manufactured by Hitachi Ltd., under conditions of a wavelength range of from 300 to 900 nm and a temperature of 25° C. Based on the absorption spectrum, it is confirmed that the comparative compound 1 in the molecular dispersion state had a maximum absorption wavelength at 636 nm.

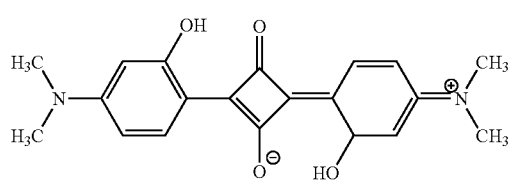

(4)

Then a solution, prepared by dissolving 50.5 mg of the comparative compound 1 in 0.5 mL of acetone, and 10 g of zirconia beads of a diameter of 1 mm are charged in a container for a planet ball mill, and subjected to a milling process at 600 rpm for 1 hour. After water is added to the planet ball mill container, the content is filtered with a 50 nm filter to obtain a colorant of Comparative Example 1.

<Preparation of Slurry>

5.05 mg of the colorant obtained in Comparative Example 1, 24 μL of an aqueous solution of sodium dodecylbenzenesulfonate, diluted to 12% by mass and 2.88 mL of purified water are mixed and ultrasonic dispersed by an ultrasonic homogenizer (VC-130, Sonics & Materials Inc.) (ultrasonic output: 4 W, with a ¼-inch horn and with an irradiation time of 60 minutes, under ice cooling) to obtain a slurry. The colorant concentration in the slurry is 0.165% by mass. Also the particle size of the colorant in the slurry, as represented by a median diameter (d50), is measured with a particle size distribution meter (HORIBA LB-550). The obtained median diameter (d50) of the fine particles is 42 nm.

<Measurement of Reflection Spectrum of Resin Film>

At first, 37 μL of the slurry containing the colorant obtained as described above (colorant concentration: 0.165% by mass), 15 μL of an aqueous dispersion of a styrene-acrylic resin latex (aqueous solution prepared by dispersing, at a proportion of 40% by mass, a resin prepared by emulsion polymerization of styrene, n-butyl acrylate and acrylic acid utilizing a surfactant), and 5 g of water are mixed, and the mixture is subjected to a dispersion process by Ultratarax to obtain a mixed slurry. Polyaluminum chloride as a coagulant is further added thereto and mixed under agitation to obtain a mixed dispersion (pseudo toner dispersion). The mixed dispersion is filtered by and deposited on a filter paper (trade name "GSWP04700", manufactured by Millipore Corp., pore diameter: 220 nm), and the deposit is heat pressed at 120° C. to form a resin film on the filter paper, thereby obtaining an evaluation sample. The evaluation sample had a resin film, having a total amount (solid mass) of the colorant and the styrene-acrylic resin latex, in grams per square meter (PMA), of 4.5 g/m$^2$, and a colorant amount (PMA) of 0.045 g/m$^2$ (corresponding to a content of colorant to resin of 1.0% by mass).

Figure 15:
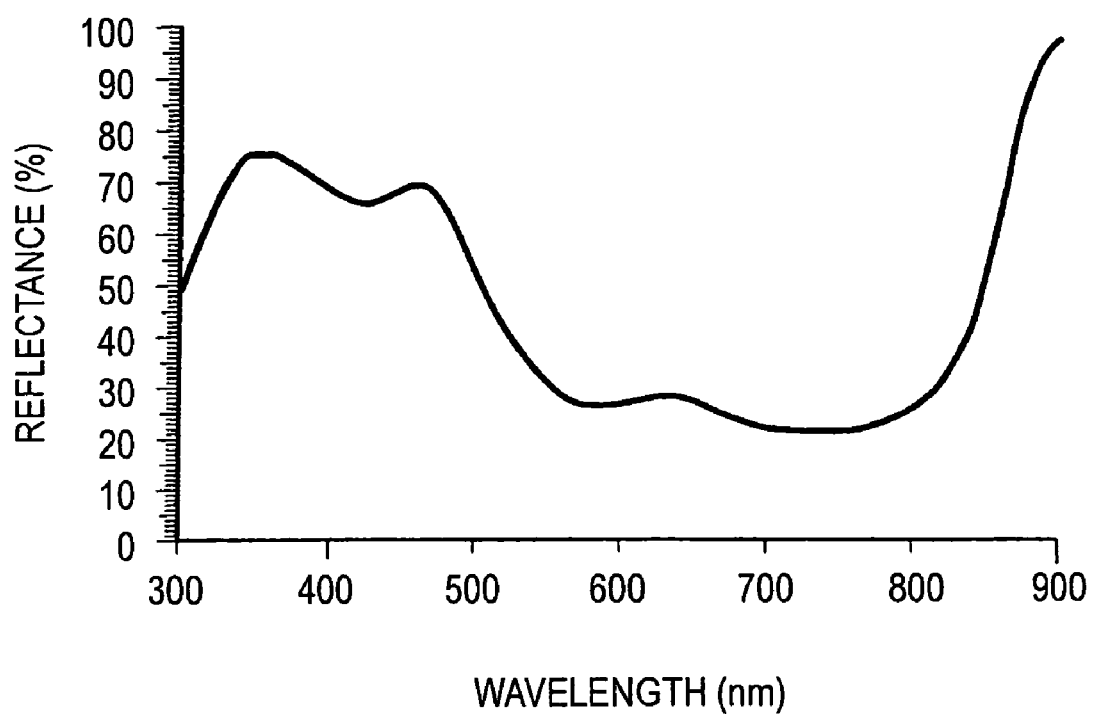
FIG. 15 is a view showing a reflection spectrum of a paper provided with a resin film, in which the colorant obtained in comparative Example 1.

The prepared evaluation sample is subjected to a measurement of reflection spectrum. The obtained reflection spectrum is shown in FIG. 15. As shown in FIG. 15, the evaluation sample utilizing the colorant of Comparative Example 1 had a large reflectance in the visible region of 500 nm or less, thus incapable of providing a reduction in the reflectance over the entire visible region. Also the evaluation sample utilizing the colorant of Comparative Example 1 showed a reduction in the reflectance by optical absorption up to about 850 nm, thus inferior in the transmittance in near infrared region, in comparison with the case of utilizing the colorant of Examples 1 to 4.

What is claimed is:

1. A toner comprising a first colorant and a binder resin,
   wherein the first colorant comprises an aggregate of a molecule having a squarylium skeleton and having a maximum absorption wavelength at about 500 nm to about 600 nm in a molecular dispersion state,
   wherein the molecule is represented by a following general formula (3):

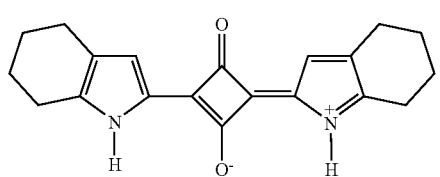

(3)

and
   wherein the median diameter of the first colorant is within a range of from 50 nm to 200 nm.

2. The toner according to claim 1, wherein the binder resin comprises a styrene-acrylic resin or a polyester resin.

3. The toner according to claim 1, further comprising a second colorant other than the first colorant in an amount of 1 wt % to 15 wt % with respect to the entire mass of the toner.

4. The toner according to claim 3, wherein the amount of the second colorant is in an amount of 3 wt % to 10 wt % with respect to the entire mass of the toner.

* * * * *